United States Patent
Östberg et al.

(10) Patent No.: US 6,504,830 B1
(45) Date of Patent: Jan. 7, 2003

(54) METHOD, APPARATUS, AND SYSTEM FOR FAST BASE SYNCHRONIZATION AND SECTOR IDENTIFICATION

(75) Inventors: Christer Östberg, Staffanstorp (SE); Fredrik Jaenecke, Lund (SE); Yi-Pin Eric Wang, Cary, NC (US)

(73) Assignee: Telefonaktiebolaget LM Ericsson publ, Stockholm (SE)

( * ) Notice: Subject to any disclaimer, the term of this patent is extended or adjusted under 35 U.S.C. 154(b) by 0 days.

(21) Appl. No.: 09/112,689

(22) Filed: Jul. 9, 1998

Related U.S. Application Data

(63) Continuation-in-part of application No. 09/097,473, filed on Jun. 15, 1998, now abandoned.

(51) Int. Cl.$^7$ ............................................... H04B 7/005
(52) U.S. Cl. ..................... 370/342; 370/328; 370/335; 370/350; 455/502; 455/525
(58) Field of Search .................. 370/328, 329, 370/330, 335, 336, 337, 342, 347, 350; 455/502, 525

(56) References Cited

U.S. PATENT DOCUMENTS

| | | | |
|---|---|---|---|
| 5,230,081 A | | 7/1993 | Yamada et al. |
| 5,673,260 A | * | 9/1997 | Umeda et al. ............... 370/342 |
| 5,870,444 A | * | 2/1999 | Mynett et al. ............... 370/513 |
| 6,134,286 A | * | 10/2000 | Chennakeshu et al. ..... 370/509 |
| 6,272,335 B1 | * | 8/2001 | Nakayama et al. ......... 455/422 |

FOREIGN PATENT DOCUMENTS

| | | |
|---|---|---|
| EP | 0 693 834 | 1/1996 |
| EP | 0 797 369 | 9/1997 |

OTHER PUBLICATIONS

Klein, A. et al., "FRAMES Multiple Access Mode 1–Wideband TDMA with and without Spreading", *Process IEEE International Conference on Personal Indoor and Mobile Radio Communcation* vol. 1, Sep. 1997, pp. 37–41.

Ovesjö, et al., "FRAMES Multiple Access Mode 2–Wideband CDMA", *Process IEEE International Conference on Personal Indoor and Mobile Radio Communication,* vol. 1, Sep. 1997, pp. 42–46.

"Volume 3 Specification of Air–interface for the 3GMobile System", Ver 0–3., IMT–2000 Study Committee Air–interface WG, SWG2, pp1–24, Dec. 1, 1997.

"UTRA Physical Layer Description FDD parts" vol. 1, ETSI SMG2 UMTS Physial Layer Expert Group, Tdoc SMG2 UMTS–L1 56/98, Meeting 2, Paris, France, Apr.28, 1998, pp1–11, Apr. 24, 1998.

* cited by examiner

*Primary Examiner*—Daniel Hunter
*Assistant Examiner*—Alan T. Gantt
(74) *Attorney, Agent, or Firm*—Burns, Doane, Swecker & Mathis, L.L.P.

(57) ABSTRACT

A method, apparatus, and system perform fast sector identification and base station synchronization. The base station transmits information in primary and secondary control channels to the remote station. The remote station performs synchronization using information in the primary and secondary control channels. A group of identification codes corresponding to the sector is determined using information in the secondary control channel. If this does not result in identification of the sector, an identification code corresponding to the sector is determined from information in the primary control channel. If this does not result in identification of the sector, the sector is identified based on information multiplied with symbols, e.g., pilot symbols, in the primary control channel, without having to decode the BCCH.

30 Claims, 4 Drawing Sheets

| SLOT 0 | | | | SLOT 1 | | | |
|---|---|---|---|---|---|---|---|
| 1 | $V_0$ | $V_0V_1$ | $V_0V_1V_2$ | 1 | $V_3$ | $V_3V_4$ | $V_3V_4V_5$ |
| SLOT 2 | | | | SLOT 3 | | | |
| 1 | $V_6$ | $V_6V_7$ | $V_6V_7V_8$ | 1 | $V_9$ | $V_9V_{10}$ | $V_9V_{10}V_{11}$ |
| SLOT 4 | | | | SLOT 5 | | | |
| 1 | $V_{12}$ | $V_{12}V_{13}$ | $V_{12}V_{13}V_{14}$ | 1 | $V_0$ | $V_0V_1$ | $V_0V_1V_2$ |
| SLOT 6 | | | | SLOT 7 | | | |
| 1 | $V_3$ | $V_3V_4$ | $V_3V_4V_5$ | 1 | $V_6$ | $V_6V_7$ | $V_6V_7V_8$ |
| SLOT 8 | | | | SLOT 9 | | | |
| 1 | $V_9$ | $V_9V_{10}$ | $V_9V_{10}V_{11}$ | 1 | $V_{12}$ | $V_{12}V_{13}$ | $V_{12}V_{13}V_{14}$ |
| SLOT 10 | | | | SLOT 11 | | | |
| 1 | $V_0$ | $V_0V_1$ | $V_0V_1V_2$ | 1 | $V_3$ | $V_3V_4$ | $V_3V_4V_5$ |
| SLOT 12 | | | | SLOT 13 | | | |
| 1 | $V_6$ | $V_6V_7$ | $V_6V_7V_8$ | 1 | $V_9$ | $V_9V_{10}$ | $V_9V_{10}V_{11}$ |
| SLOT 14 | | | | SLOT 15 | | | |
| 1 | $V_{12}$ | $V_{12}V_{13}$ | $V_{12}V_{13}V_{14}$ | 1 | 1 | 1 | 1 |

FIG. 3B

METHOD, APPARATUS, AND SYSTEM FOR FAST BASE SYNCHRONIZATION AND SECTOR IDENTIFICATION

CROSS REFERENCE TO RELATED APPLICATIONS

This application is a Continuation-in-part of a U.S. Patent Application entitled "Method and Apparatus for Fast Base Station Synchronization and Sector Identification", Ser. No. 09/097,473, now abandoned filed Jun. 15, 1998, in the names of Christer Östberg, Fredrik Jaenecke, and Yi-Pin Eric Wang.

BACKGROUND

This invention relates to a method, apparatus, and system for fast base station synchronization and sector identification, particularly in a spread spectrum communication system.

With the growing trend towards globalization in communications, there has arisen a need for global communication standards. To meet this need, the International Mobile Telecommunications (IMT) 2000 standard is being developed. In the development of the IMT2000 standard, various techniques are under consideration for channel access, including Time Division Multiple Access (TDMA), Wideband Code Division Multiple Access (W-CDMA), and a hybrid of these techniques.

In a TDMA system, each channel is assigned a specific time slot in a periodic train of time intervals over the same frequency. Each period of time slots is called a frame. In a CDMA system, different users, base stations (BS), and services are separated from each other with unique spreading sequences/codes.

In one kind of CDMA system, the informational datastream to be transmitted is impressed upon a much higher bit rate datastream generated by a pseudorandom code generator. The informational datastream and the high bit rate datastream are typically multiplied together. This combination of the higher bit rate signal with the lower bit rate datastream is called coding or spreading the informational datastream signal. The rate of the spreading code is referred to as the "chip rate". The chip rate divided by the channel symbol rate is referred as the "spreading factor" (sf).

A plurality of coded information signals are combined and modulate a radio frequency carrier wave that is transmitted, and the plurality of signals are jointly received as a composite signal at a receiver. In a system in which several users are transmitting using different spreading codes, the resulting signal is a composite signal with the different coded signals overlapping both in time and frequency. By correlating the composite signal with one of the unique spreading codes, the corresponding information signal is isolated and decoded. This type of CDMA system is sometimes referred to as a Direct Sequence system.

In another kind of CDMA system, a technique referred to as M-ary Orthogonal Keying (MOK) data modulation is used. According to this technique, one basic spreading function, e.g., a pseudo noise (PN) sequence, is phase modulated on a carrier. The spreading function is modified by other functions, such as Walsh functions, to cause a modulation orthogonal to the basic function and every other modulating function used. The orthogonal keyed data is recovered, e.g., by using parallel decoding devices, such as correlators or convolvers.

In order to set up a connection between a remote station, e.g., a mobile station (MS) or a fixed terminal, and the cellular system, the remote station must identify and synchronize with at least one BS from which the remote station can receive signals and to which the remote station can transmit signals. Each BS may serve one cell with an omnidirectional antenna or with one or more directional antennas. Since the quality of a connection is affected by interference from other users, the cell can be divided into sectors, where each sector is separated from other sectors by a unique or phase-shifted code.

This is illustrated in FIG. 1A which shows a number of BSs 120, each serving at least one cell 100, each cell containing at least one sector 110. For simplicity of illustration, only one cell is shown divided into sectors in FIG. 1A. Each sector antenna is exposed mainly to interference in the direction of the current sector. Thus, using a directional antenna largely avoids interference from other users, increasing the capacity of the cellular system. Due to the division of cells into sectors, the remote station 130 not only needs to identify the BS serving a cell but also the sector of the cell in which the remote station can transmit signals to and receive signals from the BS.

The signal strength of the signal received by the remote station 130 from a particular BS 120 may decrease for a number of reasons. For example, if the remote station is mobile, the signal strength may decrease as the remote station moves away from the BS. If the remote station is fixed, the signal strength may decrease if there is a problem at the BS and/or if new users interfere. In such cases, when the signal quality degrades, the remote station may need to be redirected to another BS. This redirection of the connection between the remote station and the BS is referred to as handoff. The performance of the connection between the remote station and the BS can be improved with respect to diversity gain, when the remote station 130 is connected to more than one BS at the same time. This can be referred to as macrodiversity. It may also be necessary to redirect a connection between a remote station and a particular BS to another sector served by the same BS. This is sometimes referred to as softer handoff. For handoff to be effective, the remote station must be able to identify a new sector and BS to which its connection will be redirected and to synchronize with the BS serving that sector. Ideally, handoff should be unnoticed (seamless) to the user.

FIG. 1B illustrates a basic frame structure of a downlink informational datastream for a communication system, such as a system according to the developing IMT2000 standard. A frame may include sixteen slots and a total of 40960 complex chips, i.e., 40960 Q-ary symbols of the high rate coded signal. Each slot may include a number of pilot symbols and a varying number of information symbols determined by the current spreading factor (sf). The pilot symbols can be used by a receiver, for example, to perform channel estimation. Each slot may include 2560 chips.

Further details regarding the frame and channel structure for the IMT2000 standard are described in IMT-2000 Study Committee Air-interface WG, SWG2, "Volume 3 Specifications of Air-interface for the 3GMobile System", Ver. 0-3. Dec. 1, 1997 and in "UTRA Physical Layer Description FDD parts (vo. 1, Apr. 24, 1998)", ETSI SMG2 UMTS Physical Layer Expert Group, Tdoc SMG2 UMTS-L1 56/98, Meeting 2, Paris, France, Apr. 28, 1998, which are expressly herein incorporated by reference.

Referring again to FIG. 1A, a BS 120 can transmit signals to one or more remote stations 130 as a single (composite) signal. The signal directed to a remote station 130 is typically spread with a Short Code that is orthogonal or mostly orthogonal to a Short Code that is used to spread the signal directed to another remote station 130. These signals are then scrambled with a second code that is sometimes referred to as a Long Code, associated with a particular BS 120. The sum of a plurality of spread and scrambled signals is then transmitted by the BS 120.

When a remote station 130 receives the composite signal, the remote station multiplies the spread signal with the Long Code and the Short Code to recreate the signal directed to that remote station, and the signal directed to the other remote station is suppressed as interference noise. Similarly, the other remote station multiplies the spread signal with the Long Code and the Short Code assigned to it to recreate the signal directed to it, and the signal directed to the other remote station is suppressed as interference noise. The receivers associated with the remote stations 130 must have acquired various levels of synchronization to the received signal, in addition to learning or knowing the applicable Long and Short Codes, in order to implement despreading, demodulation, and decoding of the information residing in that signal.

For downlink synchronization to the remote station 130, each BS 120 periodically transmits primary and secondary synchronization codes, for example, a Primary Synchronization Code (PSC) and a Secondary Synchronization Code (SSC) (or a Primary Synchronization Channel (SCH) and a Secondary SCH according to a developing ETSI standard) in downlink physical channels. For ease of explanation, reference will be made to the PSC and the SSC. For base station identification, the downlink information includes the Long Code. The Long Code is cyclically repeated every frame, i.e., the Long Code resets for each frame.

The PSC and the SSC are transmitted in primary and secondary control channels, e.g., a Perch 1 channel and a Perch 2 channel (or a Primary Common Control Physical Channel (CCPCH) and a Secondary CCPCH according to a developing ETSI standard), respectively. For ease of explanation, reference will be made to Perch 1 and Perch 2 channels. A Perch channel is a one-way physical channel from the BS to the remote station that the remote station uses, for example, for received signal strength measurement and cell selection. FIG. 2A illustrates the timeslot format of Perch 1 and Perch 2 channels. The duration of a timeslot may be, for example, 0.625 msec.

In the Perch 1 channel, which is a broadcast channel, each slot includes four pilot symbols and five information symbols. These nine symbols are scrambled by the Long Code. The Long Code may be an extended Gold Code. The remaining symbol is a Long Code Mask Symbol (LCMS). This symbol is Long Code Masked, i.e., it is not scrambled by the Long Code. Instead, the LCMS in the Perch 1 channel includes the PSC. The LCMS in the Perch 1 channel may comprise 256 chips arranged in a pattern such as an extended Gold sequence.

In the Perch 2 channel, which is also a broadcast channel, there are nine "idle" symbols, i.e., nine symbols in which no information is transmitted, and one LCMS. None of the symbols in the Perch 2 channel are scrambled by the Long Code. The LCMS in the Perch 2 channel includes the SSC.

A more detailed description of the PSC and the SSC is given in a copending and commonly assigned U.S. patent application Ser. No. 08/921,135, filed Aug. 29, 1997, in the names of Karim Jamal et al., which is expressly herein incorporated by reference.

A logical Broadcast Control Channel (BCCH) is mapped, for example, to the information symbols in the Perch 1 channel. The BCCH is broadcast from all sectors to the remote stations to deliver cell-specific information, e.g., cell identification and sector identification, and system-related information, e.g., transmit power, uplink interference power, etc. Sector identification has conventionally been performed by decoding and deinterleaving the BCCH symbols. Since the BCCH symbols also contain information that is not necessary for sector identification, e.g., power information, this conventional method for sector identification consumes an unnecessarily large amount of processing time and resources.

In order to establish or redirect a connection with a base station, the remote station needs to identify the sector to which the connection is to be redirected or in which the connection is to be established. The remote station 130 also needs to know both the slot and frame boundaries of the downlink informational datastream, for synchronization with the timing reference of the BS. For effective and seamless handoff between sectors, synchronization and identification should be performed as fast as possible, with a minimum amount of effort.

SUMMARY

It is therefore an object of the present invention to identify a sector to which a connection with a remote station is to be redirected or in which a connection with a remote station is to be established and to synchronize the remote station with the timing reference of the BS serving that sector as fast as possible and with a minimum effort for the remote station.

This and other objects are met by a method, apparatus, and system for identifying a sector to which a connection with a remote station is to be redirected or in which a connection with a remote station is to be established and synchronizing the remote station to the BS serving the sector.

According to exemplary embodiments, the base station transmits information in primary and secondary control channels to the remote station. The remote station performs synchronization using information in the primary and secondary control channels. A group of identification codes corresponding to the sector is determined using information in the secondary control channel. If this does not result in identification of the sector, an identification code corresponding to the sector is determined from information in the primary control channel. If this does not result in identification of the sector, e.g., because different sectors share the same identification code, the sector is identified based on information multiplied with symbols, e.g., pilot symbols, in the primary control channel, without having to decode the BCCH.

According to exemplary embodiments, the secondary control channel carries a sequence of symbols repeated in every frame, e.g., a sequence of symbols from a binary, Q-ary, or M-ary alphabet. According to a first embodiment, the sequence of symbols is from an m-sequence. According to a second embodiment, the sequence of symbols is from a group of (16,2) Reed Solomon (RS) code words. According to a third embodiment, the sequence of symbols is from a group of (16,3) RS code words. According to a fourth embodiment, the sequence of symbols is from a group of (16,4) RS code words. The sequence of symbols can also be taken from other types of code word groups, e.g., Hamming code word groups.

BRIEF DESCRIPTION OF THE DRAWINGS

The features, objects, and advantages of the invention will become apparent by reading this description in conjunction with the accompanying drawings, in which like reference numerals refer to like elements and in which:

FIG. 3B illustrates differential encoding and multiplication of pilot symbols according to exemplary embodiments of the invention;

DETAILED DESCRIPTION

For illustrative purposes, the following description is directed to methods for sector identification and base station synchronization in a W-CDMA system employing a standard such as the developing IMT2000 standard. The invention is not limited to this type of system, however, but is applicable to any type of communication system.

According to exemplary embodiments of the invention, sector identification and BS synchronization are provided, at least in part, by the PSC and the SSC. The PSC and the SSC can be carried in the Perch 1 channel and the Perch 2 channel, respectively.

The PSC may be used to identify a Long Code and for slot synchronization. For slot synchronization, the downlink information received by the remote station 130 is applied to a filter matched to the PSC, and the output of the matched filter has peaks corresponding to the reception times of the PSCs. From these peaks, the BS timing reference can be determined.

The SSC may be used, for example, to identify a Long Code Group (LCG) corresponding to one or more Long Codes and to identify the frame boundary.

Figure 2A:
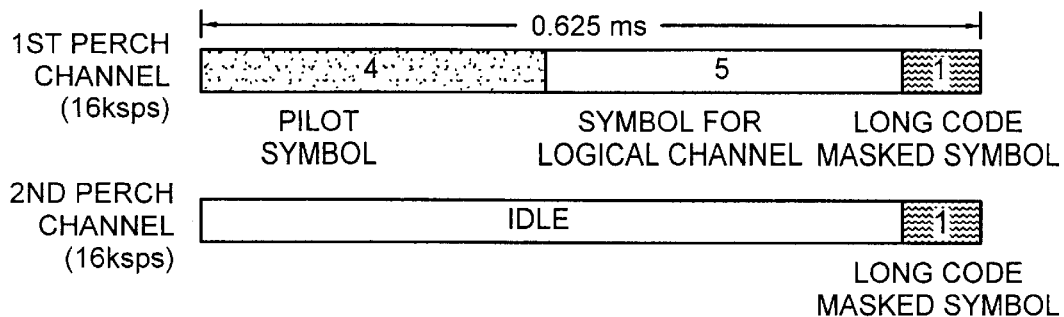
FIG. 2A illustrates a timeslot format of a Perch 1 channel and a Perch 2 channel.
Figure 2B:
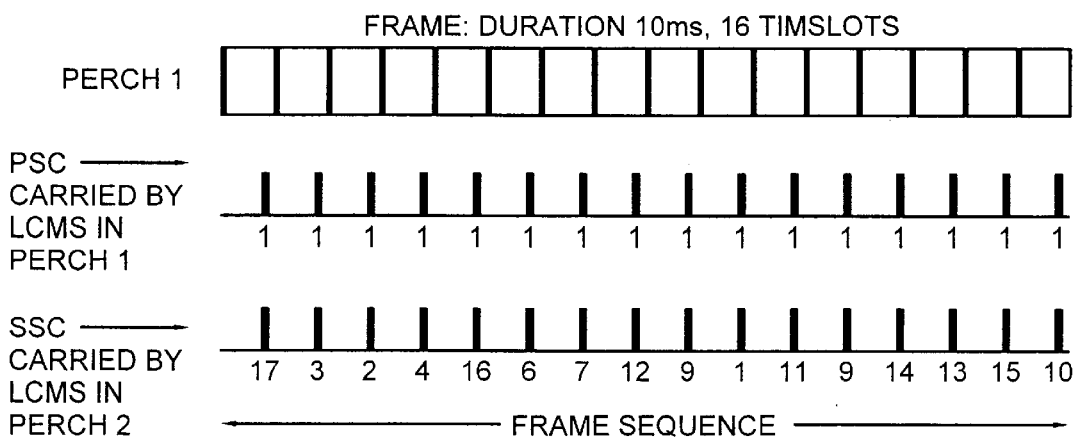
FIG. 2B illustrates a frame structure of a Perch 1 channel and a Perch 2 channel according to exemplary embodiments of the invention.

FIG. 2B illustrates the frame structure of the Perch 1 and Perch 2 channels including a PSC and an SSC, respectively, according to an exemplary embodiment of the invention. Since there are sixteen slots in each frame, there are sixteen LCMSs in each frame, one included in each slot. The LCMSs in the Perch 1 channel include the PSC, and the LCMSs in the Perch 2 channel include the SSC.

As represented by the "1's" in FIG. 2B, the PSC is the same in all slots, and the PSC sequence across the slots in a frame is the same for all the BS's.

The SSC is not the same in all slots, and the sequence of SSCs across the slots in a frame is not the same for all the BS's. Each slot in a frame of the Perch 2 channel may contain a different symbol for the SSC. The SSC in each slot may be one of several different symbols in a multisymbol alphabet containing, e.g., 17 different symbols, e.g., 1, 2, . . . 17. Each symbol is mapped, e.g., to a 256 chip extended Gold sequence. For example, as shown in FIG. 2B, in one slot the LCMS in the Perch 2 channel may carry a 17 as the SSC, in the next slot the LCMS in the Perch 2 channel may carry a 3 as the SSC, etc. The SSCs in the slots in a frame form a sequence which is cyclically repeated for each frame. Thus, although the SSCs are not the same in each slot, the sequence of SSCs across a frame is repeated in each frame.

Synchronization of the remote station to the PSC results in slot synchronization. Since the PSC and SSC are positioned at the same place in the slot, synchronization to the PSC results in synchronization with the SSC.

In order to avoid the need for the remote station to decode the BCCH symbols for sector identification, which is required in conventional sector identification, two methods are described. According to the first method, a unique Long Code is assigned to each sector. According to the second method, all sectors served by a BS are assigned the same Long Code, but the Long Codes received by the remote station are shifted, e.g., phase-shifted, with respect to each other. Information regarding how the Long Codes are shifted with respect to each other can be provided by multiplying the pilot symbols across a sequence of slots in the Perch 1 channel. Different sequences of information can be multiplied by the pilot symbols to identify the sectors.

Figure 3A:
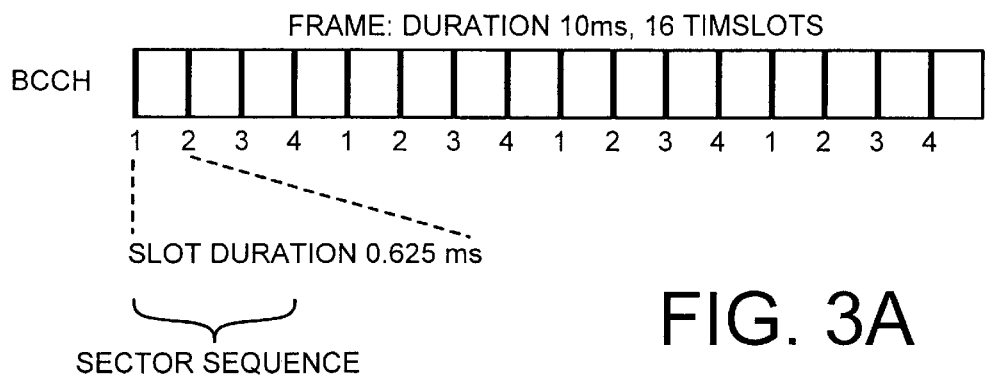
FIG. 3A illustrates a portion of the Perch 1 channel to which a BCCH is mapped according to exemplary embodiments of the invention.

FIG. 3A shows the pilot symbols across a sequence of slots in the Perch 1 channel being multiplied by a sequence of symbols. In the example shown in FIG. 3A, the frame is divided into sequences of four slots. The pilot symbols in the "1st" slot are multiplied by a first symbol in a sequence, the pilot symbols in the "2nd" slot are multiplied by a second symbol in a sequence, and so on. The sequence of symbols multiplied by the pilot symbols identifies a particular sector. Using a binary symbol alphabet for each symbol, a four symbol long sequence can differentiate sixteen sectors. For example, one sector can be identified by the sequence 0001 multiplied across the pilot symbols in the four slots, another sector can be identified by the sequence 0010 multiplied across the pilot symbols in the four slots, etc.

According to another approach, the sequence multiplied across the pilot symbols in the Perch 1 channel can be differentially encoded in order to avoid carrier phase synchronization. The first pilot symbol in every slot can be used as reference. Then, assuming there are four pilot symbols in a slot, three differential encodings per slot can be achieved.

For example, let $(v_0, v_1, \ldots, v_{14})$ be an m-sequence of length 15. The multiplication values for the pilot symbols in all the slots in a frame, using differential encoding, are shown in FIG. 3B. Thus, with five slots, an m-sequence of fifteen with fifteen cyclical shifts makes it is possible to identify up to fifteen sectors, each cyclical shift identifying one sector.

Figure 4:
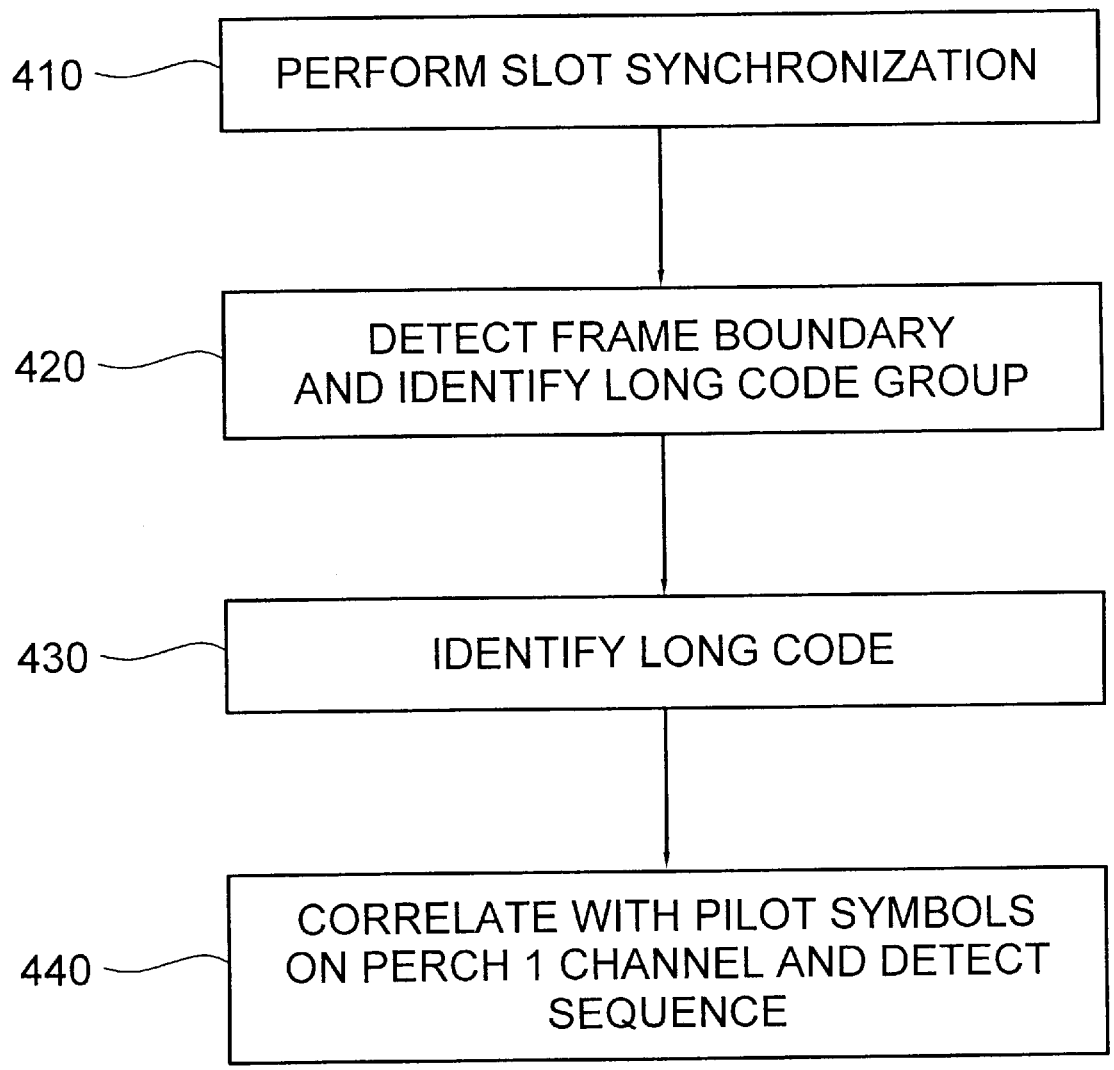
FIG. 4 illustrates a method for sector identification and synchronization according to exemplary embodiments of the invention.

FIG. 4 illustrates an exemplary method for synchronization and sector identification according to the present invention. The method begins at step 410, at which initial synchronization, e.g., slot synchronization to the PSC, is performed by the remote station. This operation may be performed by filtering a signal received at the remote station, e.g., in a conventional receiver, from the BS through, for example, a sliding correlator, i.e., a filter matched to the PSC. This provides the slot timing. A Finite Impulse Response (FIR) filter having 256 taps and an accumulator may be used for this purpose. It will be appreciated that other types of arrangements may be used for slot synchronization, for example, a group of 256 parallel correlators and an integrator.

Next, at step 420, the frame boundary is detected, and a Long Code Group (LCG) is identified from the SSC. The LCG identifies a subset of all the Long Codes. For example, if there are 512 Long Codes, there may be 32 LCGs, each LCG corresponding to a group of 16 Long Codes.

Step 420 requires correlation of the received signal against a set of possible SSCs. This step may be performed by a bank of correlators and accumulators.

Identification of the LCG in step 420 may result in identification of the sector, as explained in more detail below. If the sector is not identified in step 420, the Long Code is identified in step 430 by correlation of the Long Codes in the Perch 1 channel against the possible Long Codes in the corresponding LCG. This may be performed by, for example, a correlator and an accumulator. Of course, if the Long Code is identified in step 420, step 430 is not necessary. If each sector is assigned a unique Long Code, step 430 results in identification of the sector.

If more than one sector is assigned the same Long Code, correlation of the received signal against the pilot symbols in the Perch 1 channel and subsequent detection of the sequence multiplied with the pilot symbols across a sequence of slots are performed in step 440 to identify the sector. This step may be performed using, for example, a correlator and an accumulator.

Figure 1A:
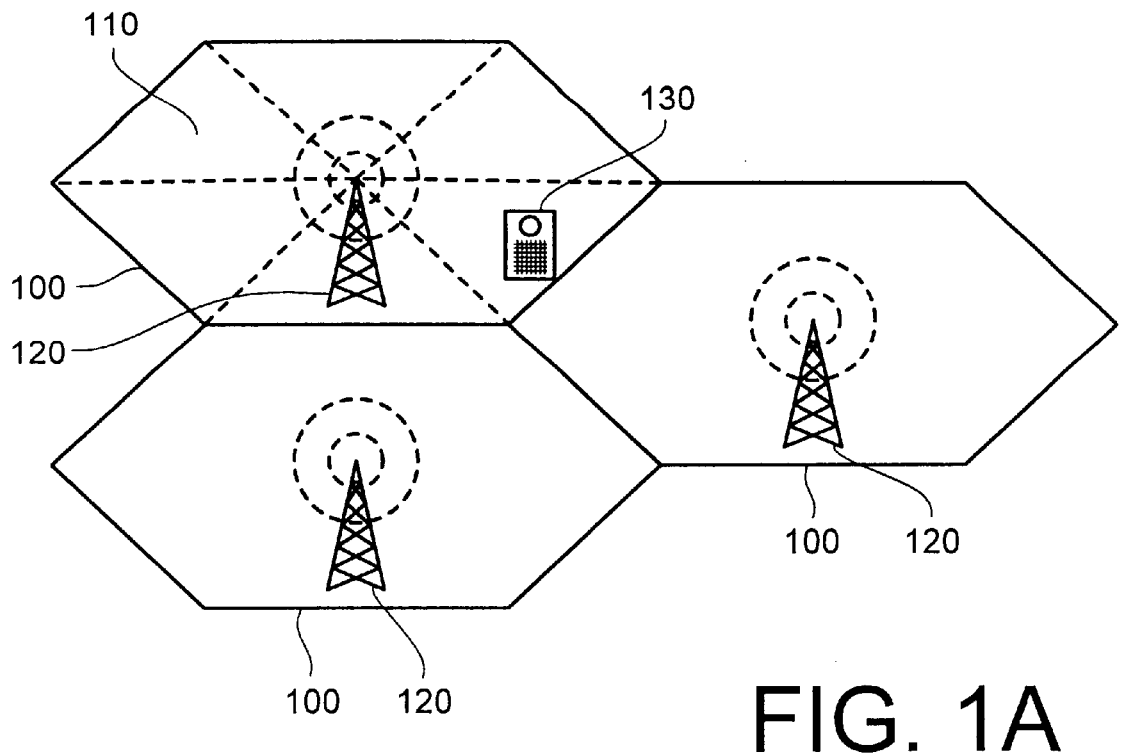
FIG. 1A illustrates an exemplary W-CDMA communication system.
Figure 1B:
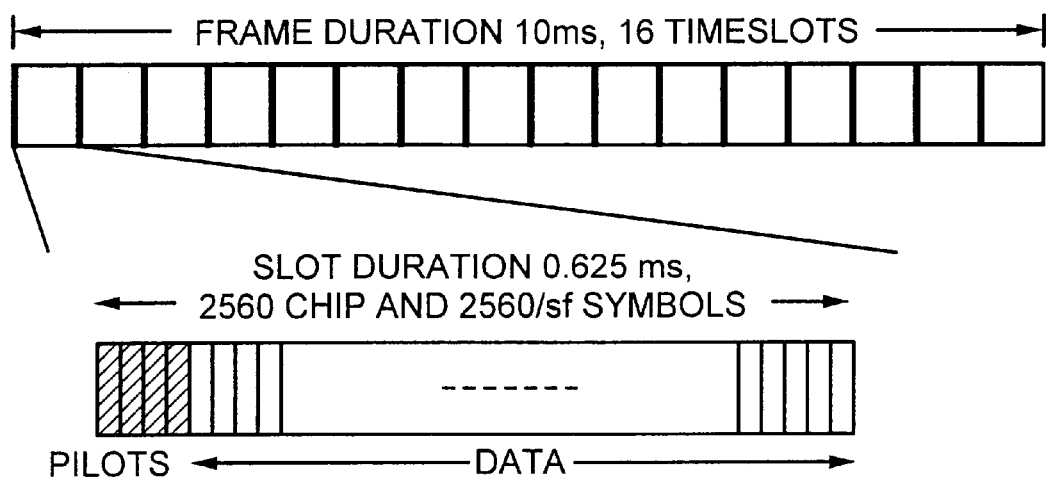
FIG. 1B illustrates a basic frame structure of a downlink informational datastream according to a proposed IMT2000 standard.

The components for performing each of the steps shown in FIG. 4 can be implemented by, for example, a processor in an Application Specific Integrated Circuit (ASIC) which can be included in a remote station such as the remote station 130 shown in FIG. 1A.

Four different embodiments are described to handle synchronization and sector identification. For illustrative purposes, it is assumed that 128 BS's, each serving 10 sectors, are used.

The initial synchronization performed in step 410 is common to all the embodiments. The amount of effort required for each of the remaining steps 420, 430, and 440 varies among the embodiments, and, in fact, some of these steps are not performed at all in some of the embodiments.

According to exemplary embodiments, the sequence of SSC symbols across the timeslots in a frame can be multiplied by a sequence of symbols from a binary, Q-ary, or M-ary alphabet.

For example, according to a first embodiment, the sequence of SSC symbols across the timeslots in a frame is multiplied by an extended "m-sequence" of length 16. This type of frame sequence, which has good auto-correlation properties and is widely used in, e.g., spread spectrum communications, is described, for example, in the above-referenced U.S. patent application Ser. No. 08/921,135.

According to this embodiment, both the LCG and the frame boundary indication are included in the SSC sequence. The code number of the SSC reflects the LCG, and information multiplied with the SSC reflects the frame timing boundary.

For example, for a system employing Binary Phase Shift Keying (BPSK), the sixteen SSC symbols in a frame can be multiplied by a predetermined sixteen element sequence. Thus, the SSC symbol in the first slot can be multiplied by the first element of the sequence, the SSC symbol in the second slot can be multiplied by the second element in the sequence, and so on. This provides the frame boundary indication. The remote station can relatively easily find the frame synchronization, e.g., based on sixteen consecutive correlations.

This technique may also be applied in other types of systems, e.g., Quadrature Phase Shift Keying (QPSK) systems.

According to the first embodiment, the Long Code is identified in step 430 by correlating the received signal with all the Long Codes in the identified LCG. Assuming that each Long Code does not uniquely identify a sector, the sector identity can be provided by multiplying the pilot symbols across a sequence of slots in the Perch 1 channel with different sequences, as described above with reference to FIG. 3. Thus, according to this embodiment, the sector is identified in step 440 by correlation with the pilot symbols in the Perch 1 channel and by subsequent detection of the multiplied sequence.

According to a second embodiment, the sequence of SSC symbols in a frame can be multiplied by a group of (16,2) Reed Solomon (RS) code words. Frame boundary indication is provided in a manner similar to the first embodiment, e.g., by multiplying the SSC with frame boundary information. The (16,2) RS code has 17 comma-free code words with unique cyclical shifts. Since there are not enough comma-free (16,2) RS code words to uniquely identify all 1280 sectors, in this embodiment, steps 420 and 430 are performed in a similar manner as in the first embodiment. In other words, the code number of the SSC identifies the LCG, and Long Code is determined by correlation of the received signal against all the possible Long Codes in the identified LCG.

In the second embodiment there is a larger symbol alphabet available for the SSC. Thus, step 420 in the second embodiment is more extensive than in the first embodiment. Also, step 420 in the second embodiment requires decoding of the RS code by an RS decoder.

Assuming that each Long Code does not uniquely identify a sector, the sector can be identified in step 440, as in the first embodiment. Of course, in both the first and the second embodiments, the sectors and cells may be planned such that the LCG's are assigned in a clustered manner, so that sectors having the same Long Code are a long way from each other. In this case, the Long Code may unambiguously identify a sector in a limited area, i.e., an area within a cluster of cells, and step 440 is not required.

According to a third embodiment, the sequence of SSC symbols in a frame may be multiplied by a group of (16,3) RS code words. The (16,3) RS code has 289 comma-free code words with unique cyclical shifts. Thus, the code number of a SSC symbol can be one of 289 numbers, each specifying a particular LCG. Using only 256 of the code words, each LCG can then correspond to five Long Codes to specify 1280 Long Codes, each Long Code corresponding to a particular sector. Thus, there is no need to perform step 440. Steps 420 and 430 are similar to that in the second embodiment. Due to the large number of LCGs, proper cell and sector planning exclude the need to perform step 430. In other words, the sectors can be planned such that the sectors having the same LCG are a long distance away from each other so that it is highly unlikely that a signal is received from both sectors by the same remote station. Identifying the LCG correspondingly also identifies the sector, so there is no need to perform step 430.

According to a fourth embodiment, the sequence of SSC symbols in a frame may be multiplied by a group of (16,4) RS code words. This corresponds to 5202 comma-free code words. In the interest of simplicity, i.e., to simplify the RS decoding, the number of code words can be reduced to 1280. Step 420 is performed in a similar manner to the second and third embodiments. Because there are enough code words to uniquely identify each sector (at least within the limited area of the 10 base stations), identification of a code word then gives the Long Code identity and thus also the sector identification, without any need to perform steps 430 or 440.

Although m-sequences and RS codes are described above, it will be appreciated that the SSC symbols in a frame may be multiplied by other types of sequences or codes, e.g., linear codes such as Hamming codes or Kerdock codes.

According to exemplary embodiments of the present invention, a method, apparatus, and system are provided for identifying a sector from which a remote station desires to communicate with a BS and for synchronizing the remote station with the BS. An advantage of the invention is that the identification of the sector is provided, without requiring the remote station to decode the BCCH. Various modifications of the SSC are provided in order to include more detailed identification parameters about the BS. Also, the pilot symbols in the portion of the physical Perch 1 channel corresponding to the BCCH can be multiplied with sector identification information.

Although described above with reference to particular embodiments, it will be appreciated by those of ordinary skill in the art that this invention can be embodied in other specific forms without departing from its essential character. For example, although described with reference to a CDMA system, the present invention is also applicable in systems using different techniques for channel access, e.g., a TDMA system or a hybrid CDMA-TDMA system. Also, although reference is made to Perch 1 and 2 channels and PSCs and SSCs, the invention is applicable to any type of primary and secondary control channels and primary and secondary synchronization codes, e.g., the Primary CCPCH, Secondary CCPCH, Primary SCH, and Secondary SCH according to the developing ETSI standard. The embodiments described above should therefore be considered in all respects to be illustrative and not restrictive.

What is claimed is:

1. In a communication system including at least one remote station and at least one base station serving a cell containing at least one sector, the base station transmitting information to the remote station in primary and secondary control channels, a method for identifying a sector in which a connection to the remote station is to be established or to which a connection to the remote station is to be redirected, the method comprising the steps of:

determining a group of identification codes corresponding to the sector using information in the secondary control channel;

if determining the group of identification codes does not result in identification of the sector, determining an identification code corresponding to the sector based on information in the primary control channel; and if determining the identification code does not result in identification of the sector, identifying the sector based on information multiplied with symbols in the primary control channel.

2. The method of claim 1, wherein the sector is identified based on information multiplied with pilot symbols in the primary control channel, without having to decode a Broadcast Control Channel (BCCH).

3. The method of claim 1, further comprising a step of performing synchronization in the remote station using information in the primary and secondary control channels.

4. The method of claim 1, wherein each sector within a limited area is assigned a unique identification code, and determining the identification code results in identification of the sector, without having to decode a Broadcast Control Channel (BCCH).

5. The method of claim 1, wherein sector identification is provided by information in the primary and secondary control channels, without having to encode a Broadcast Control Channel (BCCH).

6. The method of claim 1, wherein multiple sectors are assigned the same identification code but are assigned different information multiplied with the symbols in the primary control channel.

7. The method of claim 1, wherein the secondary control channel carries a sequence of symbols from a binary, Q-ary, or M-ary alphabet repeated every frame.

8. The method of claim 7, wherein the sequence of symbols is from an m-sequence, a group of (16,2) Reed Solomon (RS) code words, a group of (16,3) Reed Solomon (RS) code words, a group of (16,4) Reed Solomon (RS) code words, or a group of linear code words.

9. The method of claim 8, wherein for a group of (16,3) RS code words, determining the identification code results in identifying the sector, and for a group of (16,4) RS code words, determining the group of identification codes results in identifying the sector.

10. The method of claim 1, wherein said information is transmitted using time divisional multiple access techniques, code divisional multiple access techniques, or a hybrid of both techniques.

11. In a communication system in which primary and secondary control channels are transmitted from at least one base station serving a cell containing at least one sector to a remote station, an apparatus for identifying a sector in which a connection is to be established or to which a connection is to be redirected, the apparatus comprising:

means for determining an identification code group corresponding to the sector based on information in the secondary control channel;

means for determining an identification code from information in the primary control channel if the determination of the identification code group does not result in identification of the sector; and means for identifying the sector based on information multiplied with symbols in the primary control channel if determination of the identification code does not result in identification of the sector.

12. The apparatus of claim 11, wherein the sector is identified based on information multiplied with the pilot symbols in the primary control channel, without having to decode a Broadcast Control Channel (BCCH).

13. The apparatus of claim 11, further comprising means for synchronizing the remote station with the base station using information in the primary and secondary control channels.

14. The apparatus of claim 11, wherein each sector is assigned a unique identification code, and determining the identification code results in identification of the sector, without having to decode a Broadcast Control Channel (BCCH).

15. The apparatus of claim 11, wherein sector identification is provided by information in the primary and secondary control channels, without having to encode a Broadcast Control Channel (BCCH).

16. The apparatus of claim 11, wherein multiple sectors within a limited area are assigned the same identification code but are assigned different information multiplied with the symbols in the primary control channel.

17. The apparatus of claim 11, wherein the secondary control channel carries a sequence of symbols from a binary, Q-ary, or M-ary alphabet repeated every frame.

18. The apparatus of claim 17, wherein the sequence of symbols is from an m-sequence, a group of (16,2) Reed Solomon (RS) code words, a group of (16,3) Reed Solomon (RS) code words, a group of (16,4) Reed Solomon (RS) code words, or a group of linear code words.

19. The apparatus of claim 18, wherein for a group of (16,3) RS code words, determining the identification code results in identifying the sector, and for a group of (16,4) RS code words, determining the group of identification codes results in identifying the sector.

20. The apparatus of claim 11, wherein said information is transmitted using time divisional multiple access techniques, code divisional multiple access techniques, or a hybrid of both techniques.

21. A communication system comprising:
   at least one remote station;
   at least one base station serving a cell containing at least one sector, wherein the at least one base station transmits primary and secondary control channels to the at least one remote station; and
   a processor for identifying a sector in which a connection is to be established or to which a connection is to be redirected, wherein the processor determines an identification code group corresponding to the sector based on information in the secondary control channel, determines an identification code from information in the primary control channel if the determination of the identification code group does not result in identification of the sector, and identifies the sector based on information multiplied with symbols in the primary control channel if determination of the identification code does not result in identification of the sector.

22. The communication system of claim 21, wherein the sector is identified based on information multiplied with the pilot symbols in the primary control channel, without having to decode a Broadcast Control Channel (BCCH).

23. The communication system of claim 21, further comprising means for synchronizing the remote station with the base station using information in the primary and secondary control channels.

24. The communication system of claim 21, wherein each sector is assigned a unique identification code, and determining the identification code results in identification of the sector, without having to decode the Broadcast Control Channel (BCCH).

25. The communication system of claim 21, wherein sector identification is provided by information in the primary and secondary control channels, without having to encode a Broadcast Control Channel (BCCH).

26. The communication system of claim 21, wherein multiple sectors within a limited area are assigned the same identification code but are assigned different information multiplied with the symbols in the primary control channel.

27. The communication system of claim 21, wherein the secondary control channel carries a sequence of symbols from a binary, Q-ary, or M-ary alphabet repeated every frame.

28. The communication system of claim 27, wherein the sequence of symbols is from an m-sequence, a group of (16,2) Reed Solomon (RS) code words, a group of (16,3) Reed Solomon (RS) code words, a group of (16,4) Reed Solomon (RS) code words, or a group of linear code words.

29. The communication system of claim 28, wherein for a group of (16,3) RS code words, determining the identification code results in identifying the sector, and for a group of (16,4) RS code words, determining the group of identification codes results in identifying the sector.

30. The communication system of claim 21, wherein said information is transmitted using time divisional multiple access techniques, code divisional multiple access techniques, or a hybrid of both techniques.

\* \* \* \* \*